United States Patent
Dosdall et al.

(10) Patent No.: US 7,171,929 B2
(45) Date of Patent: Feb. 6, 2007

(54) METHOD TO ESTIMATE VARIABLE VALVE PERFORMANCE DEGRADATION

(75) Inventors: James Dosdall, Gross Ile, MI (US); Steve Magner, Farmington Hills, MI (US); Mrdjan Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/050,340

(22) Filed: Feb. 2, 2005

(65) Prior Publication Data

US 2006/0169232 A1 Aug. 3, 2006

(51) Int. Cl.
*F01L 1/34* (2006.01)

(52) U.S. Cl. .............. 123/90.15; 123/90.22; 123/90.23; 701/105; 60/285

(58) Field of Classification Search ............. 123/90.15; 701/105
See application file for complete search history.

(56) References Cited

U.S. PATENT DOCUMENTS

| | | | |
|---|---|---|---|
| 5,721,375 A * | 2/1998 | Bidner | 73/118.1 |
| 5,979,378 A | 11/1999 | Matsuno et al. | |
| 6,257,184 B1 | 7/2001 | Yamagishi et al. | |
| 6,758,179 B1 * | 7/2004 | McKay et al. | 123/90.17 |
| 6,877,466 B2 * | 4/2005 | Shindou et al. | 123/90.16 |
| 6,883,476 B1 * | 4/2005 | Nohara et al. | 123/90.15 |

FOREIGN PATENT DOCUMENTS

EP 1363007 11/2003

* cited by examiner

*Primary Examiner*—Thomas Denion
*Assistant Examiner*—Kyle M. Riddle
(74) *Attorney, Agent, or Firm*—Allan J. Lippa; Alleman Hall McCoy Russell & Tuttle LLP

(57) ABSTRACT

A system comprising of an engine having a first group of cylinders and a second group of cylinders, a first variable valve system in said first group, a second variable valve system in said second group, and a controller for determining degradation of operation of at least one of said first and second variable valve systems, said controller determining said degradation in response to controller errors of said valves and differences between operation of said first and second valve systems.

18 Claims, 10 Drawing Sheets

METHOD TO ESTIMATE VARIABLE VALVE PERFORMANCE DEGRADATION

TECHNICAL FIELD

The field relates to engines having variable valve actuators, and in particular to methods for determining degradation of variable cam timing actuators.

BACKGROUND

A vehicle's engine may include various devices to improve fuel economy and reduce emissions. One such device includes variable valve actuation, such as variable cam timing and/or variable valve timing. Various approaches have been used to diagnose degradation of such devices, where such degradation may result in increased emissions.

For example, in the example of Variable Cam Timing (VCT), cam position over advanced from scheduled VCT position may result in reduced residual gas, which may increase NOx emissions. Likewise, cam position over retarded from scheduled VCT position (especially at lower speeds) may result in excess residual thereby diluting combustion, which may result in slow or partial burn and thus increase HC and CO emissions.

One approach that attempts to diagnose position errors is described in EP 1 363 007. In this example, diagnostics for a feedback position control system are based on a difference or ratio between and integral value of the target position and an integral value of the actual position.

The inventors herein have recognized a disadvantage with such an approach. In particular, the inventors herein have recognized that the effect of valve timing errors on emissions may be affected by more than position errors. In other words, while errors from over advanced or over retarded cam position may affect emissions, variation in cam position between cylinders (such as between banks of cylinders) may also affect emissions. Further, these parameters can interact to have compound effects on emissions. As one example, if two banks in a V-engine have different cam positions, this may result in sub-optimal spark advance and/or open loop fueling, each of which may increase emissions.

SUMMARY

In one example, the above disadvantage of prior approaches may be overcome by a system comprising:
an engine having a first group of cylinders and a second group of cylinders;
a first variable valve system in said first group;
a second variable valve system in said second group; and
a controller for determining degradation of operation of at least one of said first and second variable valve systems, said controller determining said degradation in response to controller errors of said valves and differences between operation of said first and second valve systems.

By considering variance in both the controller errors (which can include monitoring for one or both of over-advance and over-retard) in combination with differences between cylinder groups, it is possible to obtain a more accurate determination of valve operation degradation.

In one particular example using a variable cam timing system, three variances may be included: cam variance in the retard direction, cam variance in the advance direction, and the differences between banks or groups of cylinders. If any variance index is greater than a detection threshold, a cam system slow response/target error degradation may be indicated. For example, target errors will tend to generate only a single over-advanced or over-retarded code while slow response will tend to generate both codes. In this way, it is possible to identify and/or distinguish between different types of degradation (which can have different emission effects).

DESCRIPTION OF EMBODIMENT(S)

One example engine system is described below with regard to FIG. 1, which shows an engine with a variable cam timing (VCT) system. Any suitable VCT mechanism can be used. For example, the VCT system can be a dual equal system where both intake and exhaust valves are adjusted equally via a common camshaft. Alternatively, only intake cam timing or exhaust cam timing can be utilized. Further, dual independent variable cam timing may be used where the intake and exhaust cams may be independently varied.

Figure 1:
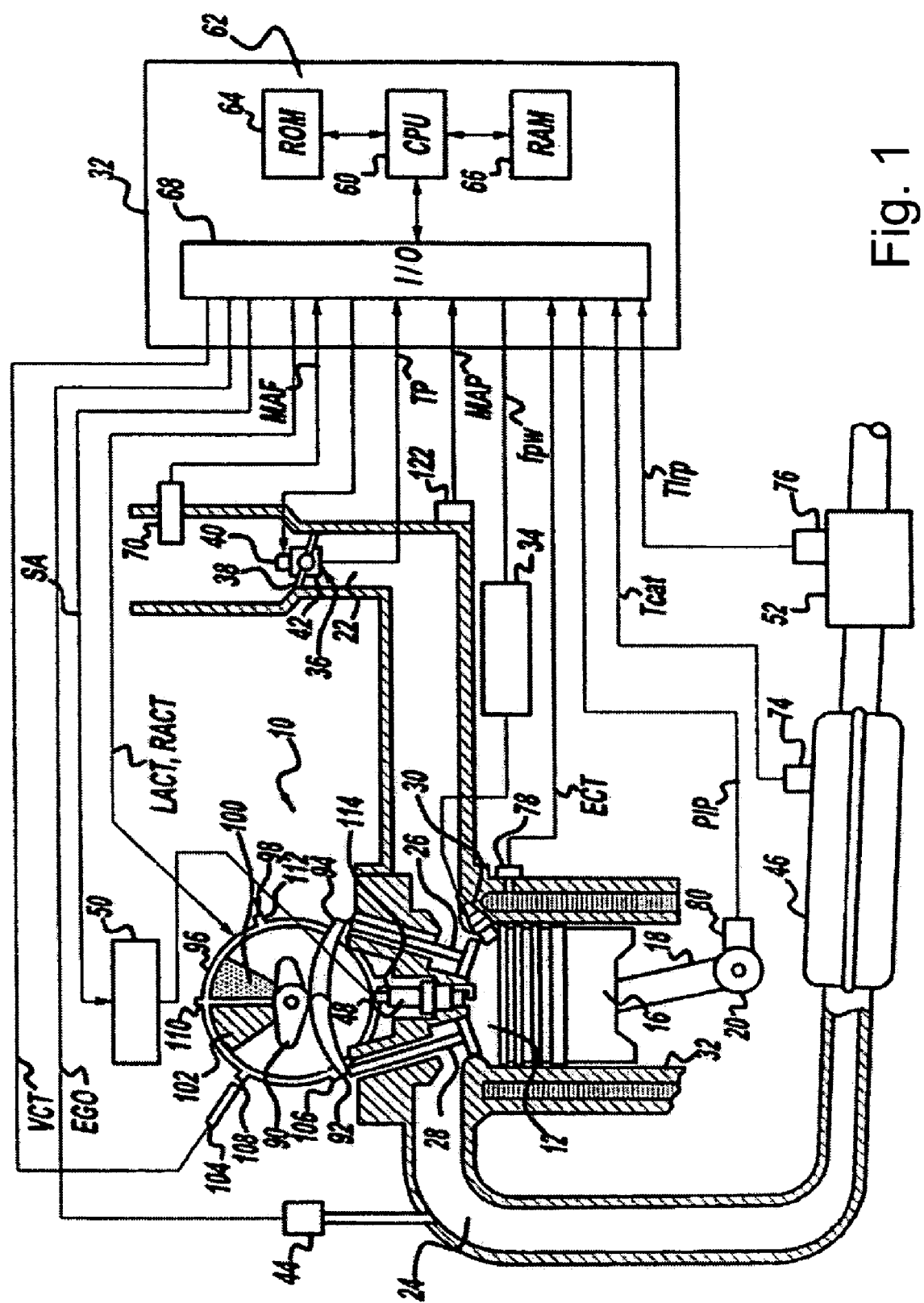
FIG. 1 is a block diagram of an engine.

FIG. 1 shows a block diagram of an engine utilizing a variable cam timing system. This embodiment includes an engine 10 having a particular variable cam timing mechanism to provide valve-timing control. However, as stated above, the present invention is equally applicable to other types of variable cam timing (VCT) engines, in addition to engines with electric valve actuators and variable valve timing engines.

The direct injection internal combustion engine 10 includes a plurality of combustion chambers or cylinders 12 having combustion chamber walls 14 with piston 16 positioned therein. Each piston 16 is coupled via a connecting rod 18 to crankshaft 20. Combustion chamber, or cylinder, 12 is shown communicating with intake manifold 22 and exhaust manifold 24 via respective intake valves 26 and exhaust valves 28. Fuel injector 30 is shown directly coupled to combustion chamber 12 for directly injecting fuel into cylinder 12 in one or more injections or events based on the pulse width of signal fpw generated by electronic engine controller 32 and conditioned or processed by conventional electronic driver 34.

Intake manifold 22 may include a throttle body assembly 36 having a throttle plate or valve 38 which may be used to modulate air flow through intake manifold 22. In this particular example, throttle plate 38 is coupled to electric motor 40 which receives control signals from controller 32 to position throttle plate 38 within intake manifold 22. The position of throttle plate 38 is monitored by an appropriate throttle position sensor 42 which provides a throttle position (TP) signal to controller 32. Closed-loop feedback control of the position of throttle plate 38 is performed by controller 32 to control airflow through intake manifold 22 and into cylinders 12. This configuration is commonly referred to as an electronic throttle control (ETC) or drive-by-wire system because there is no mechanical linkage between the driver's foot pedal and the throttle valve.

Exhaust gas oxygen sensor 44 is shown coupled to exhaust manifold 24 upstream of catalytic converter 46. In this particular example, sensor 44 provides a corresponding signal (EGO) to controller 32 which is then converted into an associated two-state signal (EGOS) used in closed loop lambda control. A high voltage state of signal EGOS indicates exhaust gases are rich of stoichiometry and a low voltage state of signal EGOS indicates exhaust gases are lean of stoichiometry. Various other types of exhaust gas sensors may also be used and have various advantages and trade-offs as well known by those of skill in the art. For example, UEGO sensors may be used.

Controller 32 controls operation of engine 10 and selects an appropriate operating mode for current operating conditions and driver demand. For example, in the case of a DISI engine, stratified or homogeneous operation can be selected. In a port fuel injected case, stoichiometric, rich, or lean operation can be selected.

To further reduce tailpipe emissions, a second three way catalyst (emission control device 52) may be used and may be positioned downstream of catalytic converter 46. Device 52 can absorb the NOx produced when engine 10 is operating lean of stoichiometry. Device 52 can then be periodically purged or regenerated to maintain its effectiveness. During a purge cycle, engine 10 is operated in a rich or stoichiometric homogeneous mode such to increase reductants (such as HC and CO) in the feedgas passing through LNT 52. The excess HC and CO reacts with the stored NOx to purge or regenerate device 52.

Engine controller 32 is shown in FIG. 1 as a microcomputer including a microprocessor unit 60 in communication with various computer readable storage media, indicated generally by reference numeral 62, via a data and address bus. Computer readable storage media 62 preferably includes physical memory devices such as read-only memory (ROM) 64, random-access memory 66, and the like capable of storing data representing executable instructions and calibration information used by microprocessor 60 to control engine 10. Computer readable storage media 62 may include various other types of temporary or persistent memory or storage such as EPROM, EEPROM, flash, or any other type of magnetic, optical, or combination devices capable of data storage. Controller 32 also includes various input/output ports 68 which may provide signal conditioning, detection, scaling, short circuit protection, and the like, to communication with various sensors and actuators in controlling engine 10.

In operation, controller 32 receives signals from various sensors preferably including a mass air flow sensor (MAF) 70, a manifold pressure sensor (MAP) 72, a catalyst temperature sensor (Tcat1) 74, an LNT temperature sensor (Tcat2) 76, an engine coolant temperature sensor (ECT) 78, a and a crankshaft position sensor 80, for example. An engine speed signal (RPM) is generated by controller 32 from an ignition profile signal (PIP) generated by crankshaft position sensor 80 in response to rotation of crankshaft 20.

Continuing with FIG. 1, camshaft 90 of engine 10 is shown communicating with rocker arms 92 and 94 for actuating intake valves 26 and exhaust valves 28 to control the air charge entering cylinder 12 and the exhaust gases exiting cylinder 12. Camshaft 90 is directly coupled to housing 96. Housing 96 forms a toothed wheel having a plurality of teeth 98. Housing 96 is hydraulically coupled to an inner shaft (not shown), which is in turn directly linked to camshaft 90 via a timing chain (not shown). As such, housing 96 and camshaft 90 rotate at a speed substantially equivalent to the inner camshaft. The inner camshaft rotates at a constant speed ratio relative to crankshaft 20.

Variable cam timing is provided by manipulation of the hydraulic coupling to change the relative position of camshaft 90 to crankshaft 20. The hydraulic coupling is manipulated by varying hydraulic pressures in advance chamber 100 and retard chamber 102. Controller 32 sends control signals (LACT,RACT) to conventional solenoid valves (not shown) to control the flow of hydraulic fluid either into advance chamber 100, retard chamber 102, or neither. By allowing high pressure hydraulic fluid to enter advance chamber 100, the relative relationship between camshaft 90 and crankshaft 20 is advanced. Thus, intake valves 26 and exhaust valves 28 open and close at a time earlier than normal relative to crankshaft 20. Similarly, by allowing high pressure hydraulic fluid to enter retard chamber 102, the relative relationship between camshaft 90 and crankshaft 20 is retarded. Thus, intake valves 26 and exhaust valves 28 open and close at a time later than normal relative to crankshaft 20.

Teeth 98, being coupled to housing 96 and camshaft 90, allow for measurement of relative cam position via cam timing sensor 104 by providing a signal (VCT) to controller 32. Teeth 98 preferably include equally spaced teeth 106, 108, 110, and 112 which can be used for measurement of cam timing, in addition to a tooth 114 preferably used for cylinder identification.

While FIG. 1 shows a single cylinder, engine 10 may include a plurality of cylinders which may be arranged in groups and/or banks. For example, a V-type engine may be used, with 3 or 4 cylinders on each side of the V representing a bank.

As described in more detail below, a diagnostic approach is described to quantify variable valve performance. In one example, metrics are designed such that they correlate with tailpipe emission changes that are due to valve operation. Then, the metrics are processed further to assign errors to existing specified degradation conditions. Finally, it is determined if sufficient valve operation has occurred to detect if degradation exists, and if so indicate to the controller strategy that valve monitor operation has occurred for the vehicle trip.

In one example, the determination of degradation is independent of intake airflow and/or rotational speed, thereby reducing reliance on additional inputs (although such parameters could be used, if desired). Rather, in the example of monitoring a VCT system, VCT position sensors are utilizes. Specifically, one proposed method recognizes that the amount of excess emissions may depend (nonlinearly) on the size of the VCT error. Therefore, in one example, a routine is used that accumulates (integrates) square errors, rather than using timers (although timers may be used, if desired). Further the integrated error may be implemented with a forgetting factor, so that a fixed error plateaus to a final value, and is reduced if the VCT error is removed. Further still, in one example, the potential of bank-to-bank (or cylinder-to-cylinder) errors contributing to excess emissions may be considered by tracking such error.

As noted above, variable valve timing (such as, for example, VCT) may affect feedgas engine emissions through its effects on burned gas dilution and combustion quality. For example, dual-equal variable cam timing (de-VCT) degradation can have the following effects 1) Cam position over advanced from scheduled VCT position (where cam position may be the difference in the phase angle between the engine crankshaft and camshaft from a typical fixed cam engine setting, and where increasing the cam position is retarding the camshaft from its typical setting). In such a condition, the engine cylinder gasses may have reduced residual, which may increase NOx emissions.

2) Cam position over retarded from scheduled VCT position. At lower loads and engine speeds, such as idle, too much residual may dilute combustion, which may result in slower burn or increased potential for incomplete combustion, and thereby increase HC and CO emissions.

3) Two groups of cylinders (e.g., two banks in a V-engine) have different cam positions. This condition may result in sub-optimal spark advance and/or open loop fueling for one or both of the cylinder banks, each of which may increase emissions.

Furthermore, various interactions between the above mechanisms may affect the level of degradation. Therefore, in one approach, the combined effects of degradation may be included. For example, non-ideal operation of a variable valve actuator (such as a VCT actuator) does not necessarily increase tailpipe emissions. For example, a dual equal VCT system that becomes fixed at a mid-range retarded position may have lower overall emissions (though compromised in drivability and engine smoothness) than a correctly operating system because NOx are reduced and CO and HC remain in acceptable limits.

As another example, various different situations can each contribute to degraded emission performance. For example, the cams may be fixed (mechanical interference or electrical solenoid degradation), they may be range limited because of engine assembly errors, or they may have undesired transient response to control commands (too slow or too fast, often due to engine oil viscosity-hydraulic effects on the actuators).

In this way, by avoiding intrusive testing, it is possible, if desired, to substantially continuously operate the variable valve operation monitoring. For example, in one example, the diagnostic approach evaluates whether or not sufficient conditions of operation (e.g., sufficient VCT operation) exist to determine if any potential degradation may cause degraded emission performance to be identified.

Figure 2:
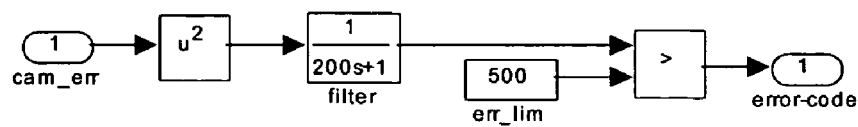
FIG. 2 shows signal processing from each cam error to setting the error-code. The dynamic block, the filter, is shown as continuous time representation, but can be implemented as a rolling average filter.

Referring now to FIGS. 2-X, one example approach is described. In this example, three mechanisms for excess emissions creation caused by VCT degradation may be considered utilizing three "error" signals: over-advanced cam error, over-retarded cam error, and the difference between the banks error. Further, in order to have an accurate account of the VCT response rate a cam phase expected signal, cam_exp, is used. This value is based on cam desired (cam_des) and a model of the VCT actuator. A properly operating variable valve system may have some lag between desired and measured cam position, which is taken into consideration in the diagnostics, as described below. Hence, the over-advanced and over-retarded cam errors stay equal to or near zero when the actual cam angle is between expected and desired. The difference between the banks error utilizes additional processing because the bank difference effect may be sensitive to overall VCT retard. I.e., a 10 degree difference error near full advanced may have a smaller effect on emissions than the same error at retarded conditions. Thus, in one example, the bank difference error may be multiplied by a factor determined from the average position of the two banks. The greater the average cam retard, the larger the weighting factor scaling the error. Thus, in this example, the following equations may be used:

$$\text{cam\_adv\_err} = \begin{cases} \min\{\text{cam\_des, cam\_exp}\} - \text{cam\_angle} & \text{if } \text{cam\_angle} < \min\{\text{cam\_des, cam\_exp}\} \\ 0 & \text{if } \text{otherwise} \end{cases}$$

$$\text{cam\_ret\_err} = \begin{cases} \text{cam\_angle} - \max\{\text{cam\_des, cam\_exp}\} & \text{if } \text{cam\_angle} > \max\{\text{cam\_des, cam\_exp}\} \\ 0 & \text{if } \text{otherwise} \end{cases}$$

$$\text{cam\_diff\_err} = (\text{cam\_angle}[0] - \text{cam\_angle}[1]) \times \text{Fn\_cam\_range\_sens}\left(\frac{\text{cam\_angle}[0] + \text{cam\_angle}[1]}{2}\right)$$

where indices 0 and 1 correspond to the two banks. The same computation of cam_adv_err and cam_ret_err is done on both banks separately but, but for the sake of simplicity, the indices are suppressed in the expressions above.

Note that in one example an integrator with a forgetting factor can be designed, to be used in combination with integrating the square error. The recursive implementation of this algorithm is practically the same as a first order low pass filter and may be implemented as a discrete low pass filter function. In this way, potential issues with a pure integrated may be reduced.

Specifically, small deviations from an ideal response result in little if any emissions increase, while larger control variable errors may result in exponentially larger emissions errors. Thus, accumulating (integrating) the square error may be more advantageous. Likewise, integration with a pure integrator may produce degraded results since, over time, even a near perfect VCT operation may eventually reach an integrated level that is above an error limit.

Optionally, in the case of a V-type engine, both banks may be monitored for both over advance and over retard errors. Hence, each type of error (over-advanced on two banks, over-retarded on two banks, and difference between the banks) can have a filter based accumulator producing an error index to be compared with a predetermined, calibratable threshold that is used to set an OBD p-code indicating degradation that could result in emissions exceeding 1.5 times the regulation on the US-75 cycle. The processing of cam_adv_err and cam_ret_err, each for both banks (i.e. four out of five channels), needed is shown in FIG. 2. The output of the filter block in FIG. 2 for a sustained cam_err, will build up at a rate determined by the filter's time constant (shown here as 200 seconds), and then "plateau" to a fixed value of the square of cam_err. However, various other parameters may be used, and the time constant may be variable based on operating conditions.

In addition to the diagnostic approach described above, a monitor may be optionally provided for identifying how often the vehicle is driven under conditions that allow the threshold monitor to detect degradation that could result in increased emissions that should be identified. Thus, in one example, a performance rate monitor checks if the variable valve actuator (e.g., VCT) desired signal changes sufficiently (to detect possible target errors) and with sufficiently high rate (to detect possible slow response). This may be referred to as an "excitation" monitor. For each drive that it is determined the VCT command provides sufficient excitation, the value of the numerator for the VCT system is incremented.

In one approach, the excitation monitor for the example of a VCT system may be partitioned into two parts:
1) Detecting if the desired (commanded) VCT signal during the drive allows for the detection of target errors.
2) Detecting if the desired VCT signal allows for the detection of slow response.

The partition can allow independent calibration of the two excitation monitors, one for the target errors and the other for the slow response of the VCT actuators.

Figure 3:
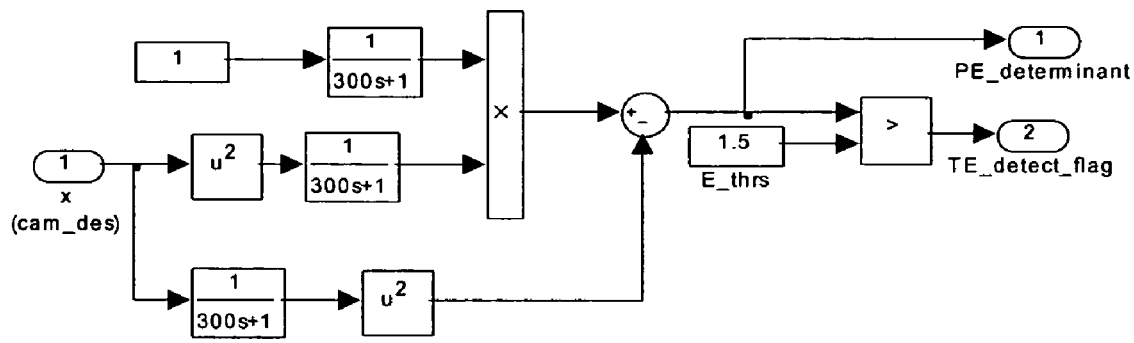
FIG. 3 shows a block diagram of the target error excitation monitor. The dynamic blocks are in continuous time representation. The input, x, may be cam_des in one example.

In one example, an excitation monitor is developed for target errors as shown in FIG. 3. The exitation monitor is developed from the theory of "persistence of excitation," where E is the excitation threshold, and the "PE-determinant" signal is the value of the determinant and the "TE_detect_flag" (TE stands for target error) identifies whether the determinant has exceeded the E-threshold indicating that there is enough information to have a degradation detected if one were present. The value of TE_detect_flag is used together with a flag computed from the response rate excitation monitor (described below) to increment the numerator of the performance rate OBD monitor.

Figure 4:
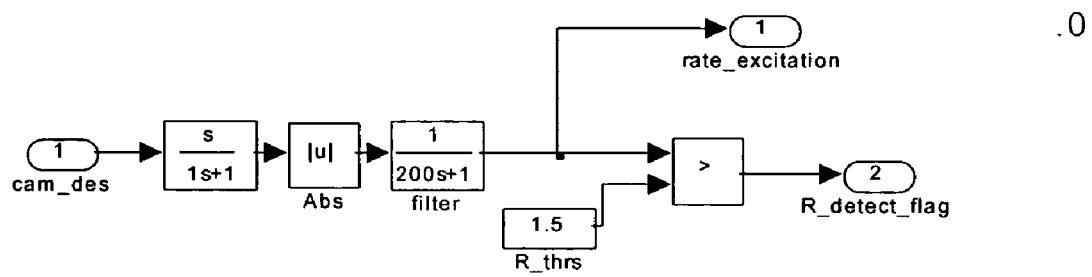
FIG. 4 shows a block diagram of an example rate excitation monitor.

Continuing with the above example, the target error excitation monitor requires that the cam desired changes sufficiently often to detect a target error, but would not be negatively affected if the required rate of change of cam position were relatively slow. On the other hand, a slow cam change request may not expose actuator inability to move fast. If a slow rate of response can affect emissions enough so they exceed 1.5 times the regulation, a rate excitation monitor (REM) may be introduced, if desired. One such system is shown in FIG. 4.

The rate filter of the REM may have a form of an approximate differentiator (or high-pass filter) and can react to the rate of change of the cam_des. The larger the requested rate of change the larger the output signal from the filter. If cam_des is constant, the output of the rate filter is 0. One example takes the absolute value of the filtered cam rate before taking it into the accumulator (a filter that approximates integration with forgetting). If the accumulated absolute cam rate is larger than the rate threshold (R-thrs), R_detec_flag may be set, indicating that there is enough rate excitation to decide if the actuator (e.g., a VCT actuator) rate of change is too slow to stay within 1.5 times the regulated emission standard.

The numerator of the performance rate monitor may be incremented if the monitor has seen enough data to determine if a variable valve actuator has degraded sufficiently. In one example, the numerator is incremented if any of the p-codes are set or if the rate excitation and PE-determinant both exceed their calibratable thresholds (E_thrs, and R_thrs).

Referring now to FIG. 5–12, an example details are provided for one example implementation.

Figure 5:
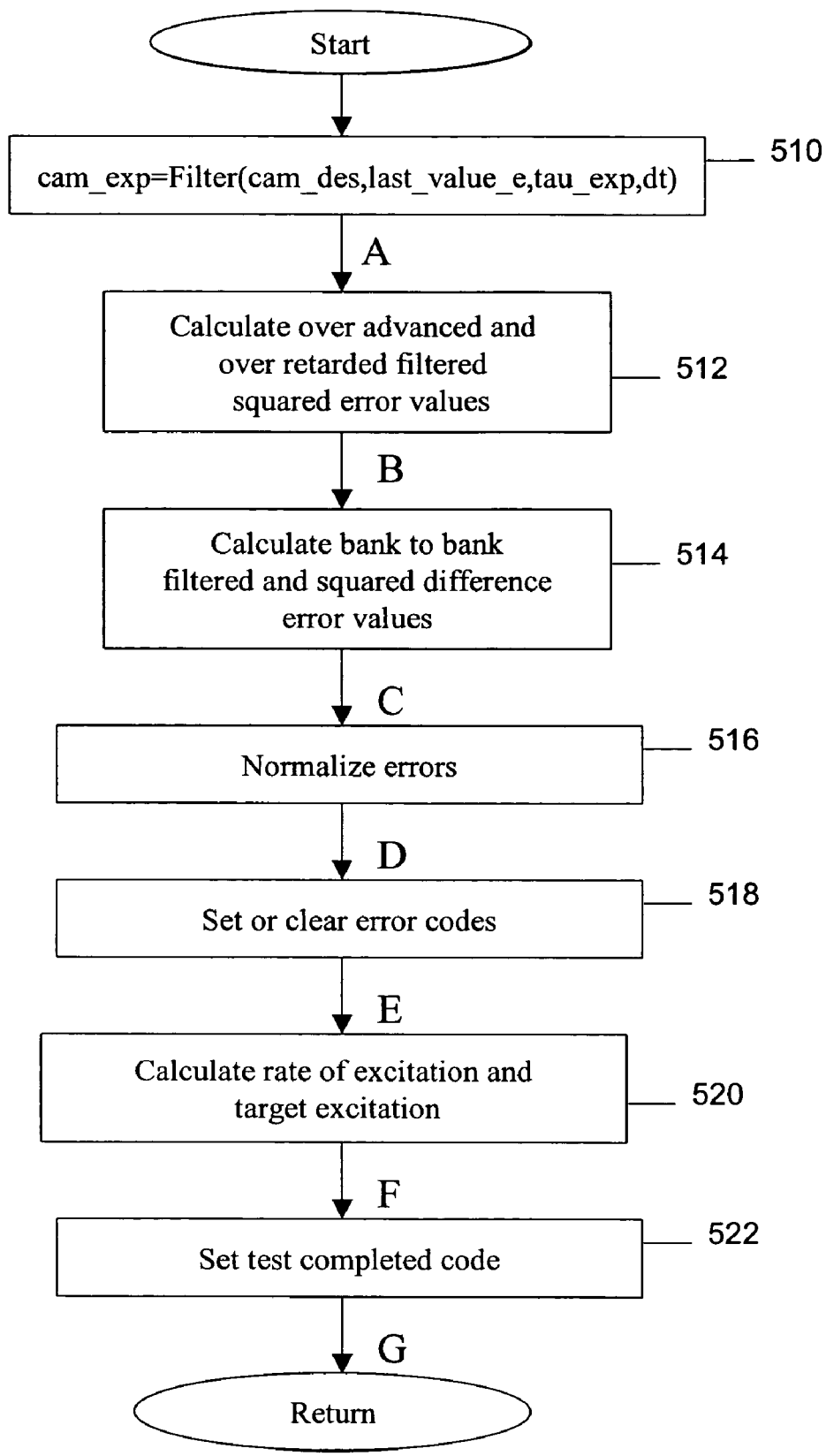
FIGS. 5–12 are high level flowcharts.

FIG. 5 shows high level flow that may be called by the controller 32 strategy. Inputs are cam_des and measured VCT position of bank 1 (cam[1]) and of bank 2 (cam[2]). As noted above and shown in step 510, cam_exp is calculated by placing cam_des into a discrete low pass filter that uses last_value_e (the value of cam_exp from the previous call to this algorithm), tau_exp (the time constant that approximates behavior the VCT response under normal operating conditions), and dt (the time between current and previous calls to the algorithm).

The steps of FIG. 5 represent the flow diagrams of FIGS. 6 to 12. Each step in FIG. 5 is connected to the next with a letter labeled arrow, shown as connectors in the following figures.

Figure 6:
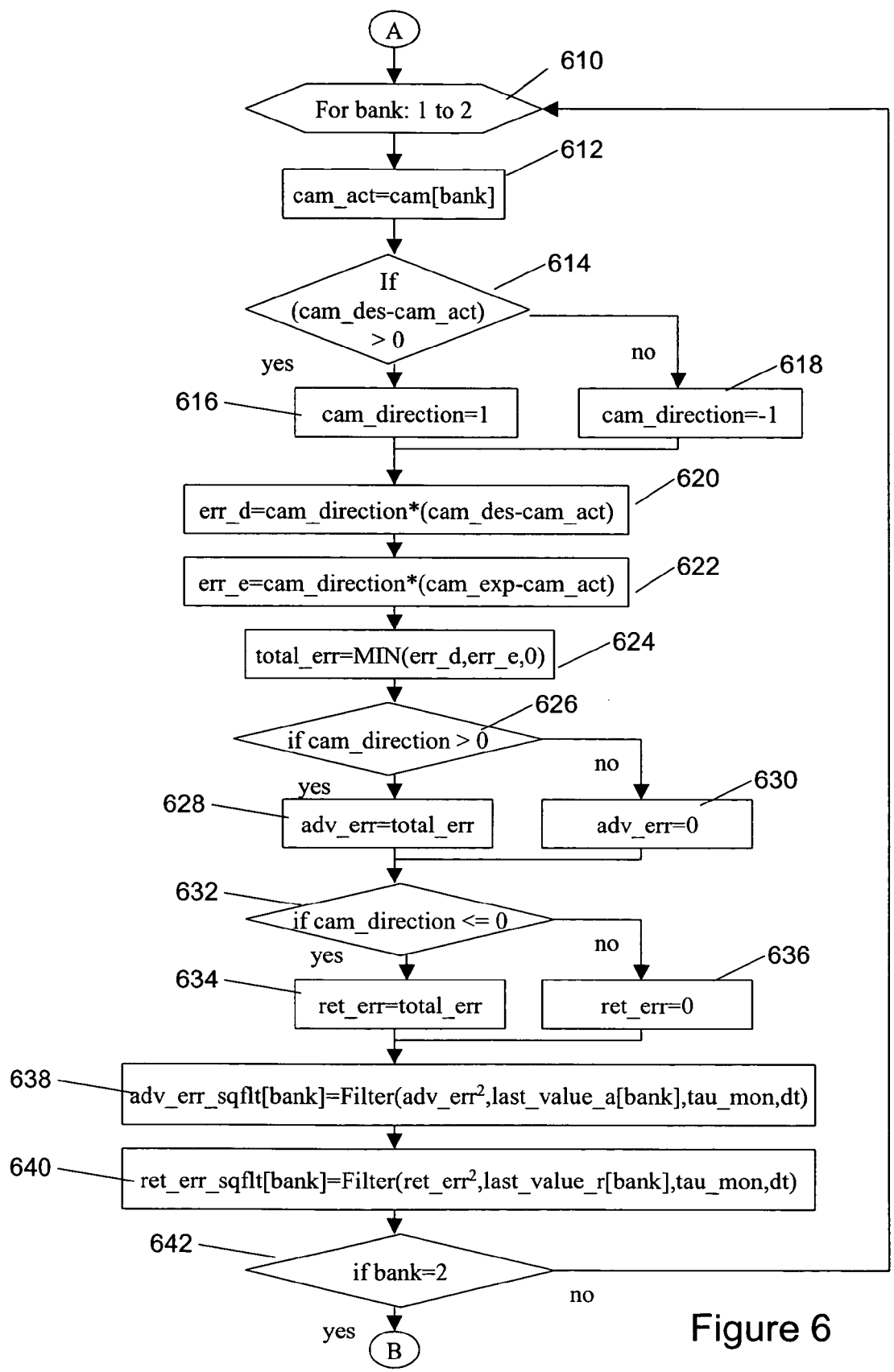

From step 510, the routine continues to step 512 to calculate over advance and over retarded error values, which is performed by the routine of FIG. 6. Then, in step 514, the routine calculates the bank to bank difference errors, which is performed by the routine of FIG. 7. Then, in steps 516 and 518, the routine determines the allocation of detected errors to be used for setting and clearing error codes that are needed for the OBD monitoring function, which are performed by the routines of FIGS. 8–9. Then, in step 520, the routine sets of clears error codes, which is performed by the routine of FIG. 10. Then, in step 522, the routine calculates the rate of excitation and target excitation, which is performed by the routine of FIG. 11. Finally, the routine sets the test completed code, which is performed by the routine of FIG. 12. Then, the routine returns to the controller strategy.

Referring now to FIG. 6, it shows a flow diagram for the calculating over advanced and over retarded filtered square errors. The flow diagram represents the process of updating each bank by employing a "for" loop (610, 642). Indexing by bank number is used (612), although other indexing may be used. The initial steps of FIG. 6 (614, 616, and 618) determine the direction of PCM desired cam movement. If the cam desired is larger than the cam actual, this indicates that the PCM is attempting to move the cam in the retarded direction, otherwise it is moving in the advanced direction. The next steps (620 and 622) calculate the error between the desired and actual and the desired and expected. These errors are adjusted for the cam direction, effectively determining the absolute value of the error for err_d, but not necessarily for err_e. If the actual cam position is between the desired and expected cam positions (err_e will be a negative value since cam_exp lags cam_des), it is assumed that the impact on tailpipe emissions will be neutral. The total_err is clipped to the minimum of err_d, err_e, and 0 in 624. This allows errors to be accounted for if the actual cam overshoots the command from the PCM during VCT position changes.

The cam_direction variable is used again in 628 to allocate the error to adv_err or to ret_err (630, 632, 634, and 636). A discrete low pass filter that uses the square of the error variable as an input calculates the square filtered errors (638 and 640). The time constant, tau_mon, is typically shared by all the square error filtered terms that are used as metrics for this method. Each metric could use its own time constant without violating the proposed method's assumptions, but this is typically not necessary.

Figure 7:
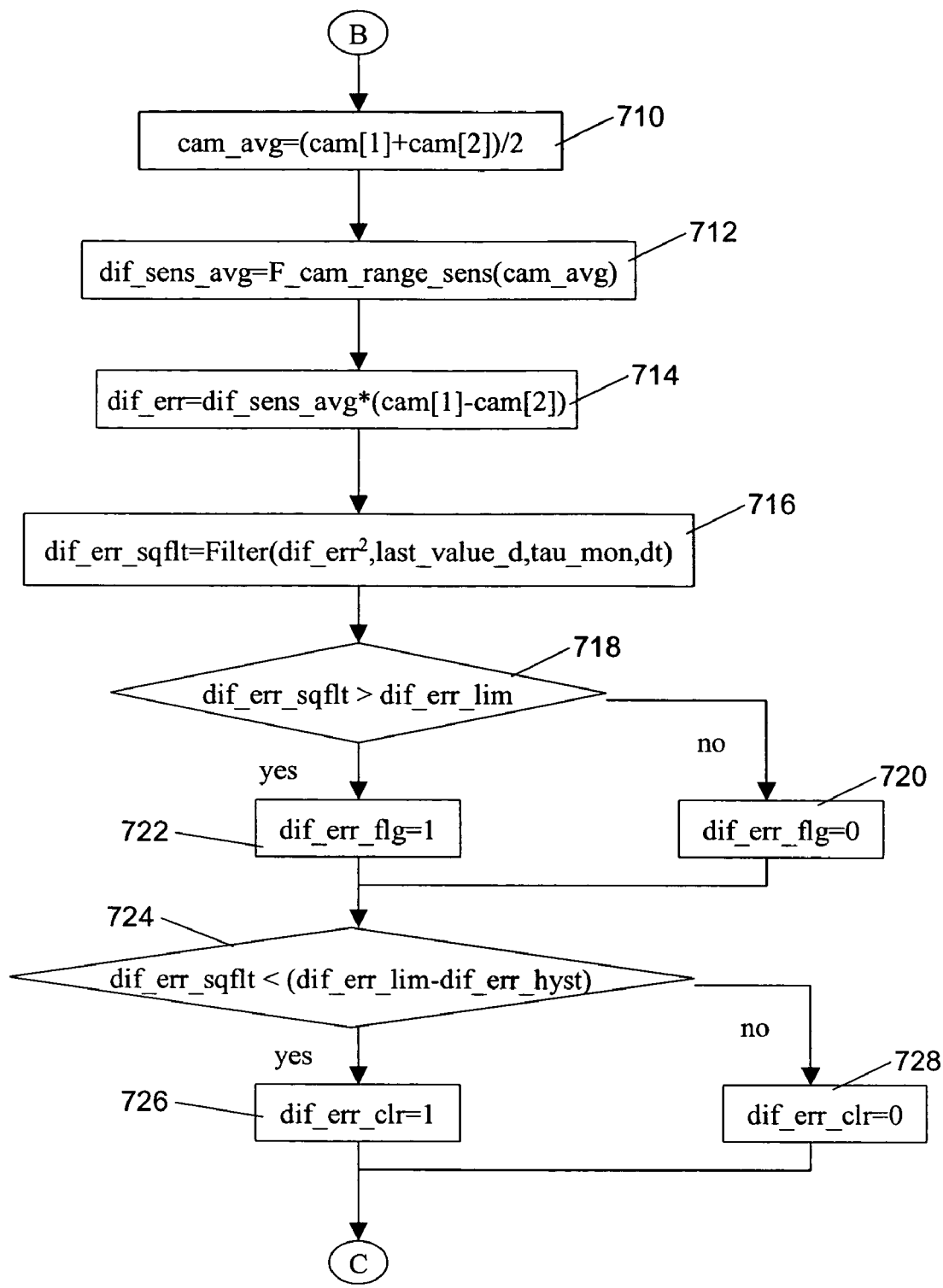

Referring now to FIG. 7, a routine is shown that calculates the bank to bank difference errors. The cam_avg (710) is the average of the two banks positions. The variable dif_sens_avg (712) is calculated by using a lookup function that relates cam_avg to a sensitivity factor and is used in the next step 714 to adjust the bank to bank difference error (dif_err) for VCT retarded operation. The metric for bank to bank difference (716), dif_err_sqflt, is updated in the same fashion as the advanced and retarded square filtered errors were in FIG. 6.

The next set steps in FIG. 7 are to determine if a difference error between the banks is large enough to increase emissions past a limit (718), and if so, set dif_err_flg=1 (722), and if not, set dif_err_flg=0 (720). Also, there is a potential to clear a previous identification of degradation (from a previous vehicle drive, as an example), if the difference error is no longer present (724, 726, and 728). The conditions to clear are intended to be more difficult to satisfy once an error has been detected, so the dif_err_sqflt value may be below the value of dif_err_lim−dif_err_hyst.

Figure 8:
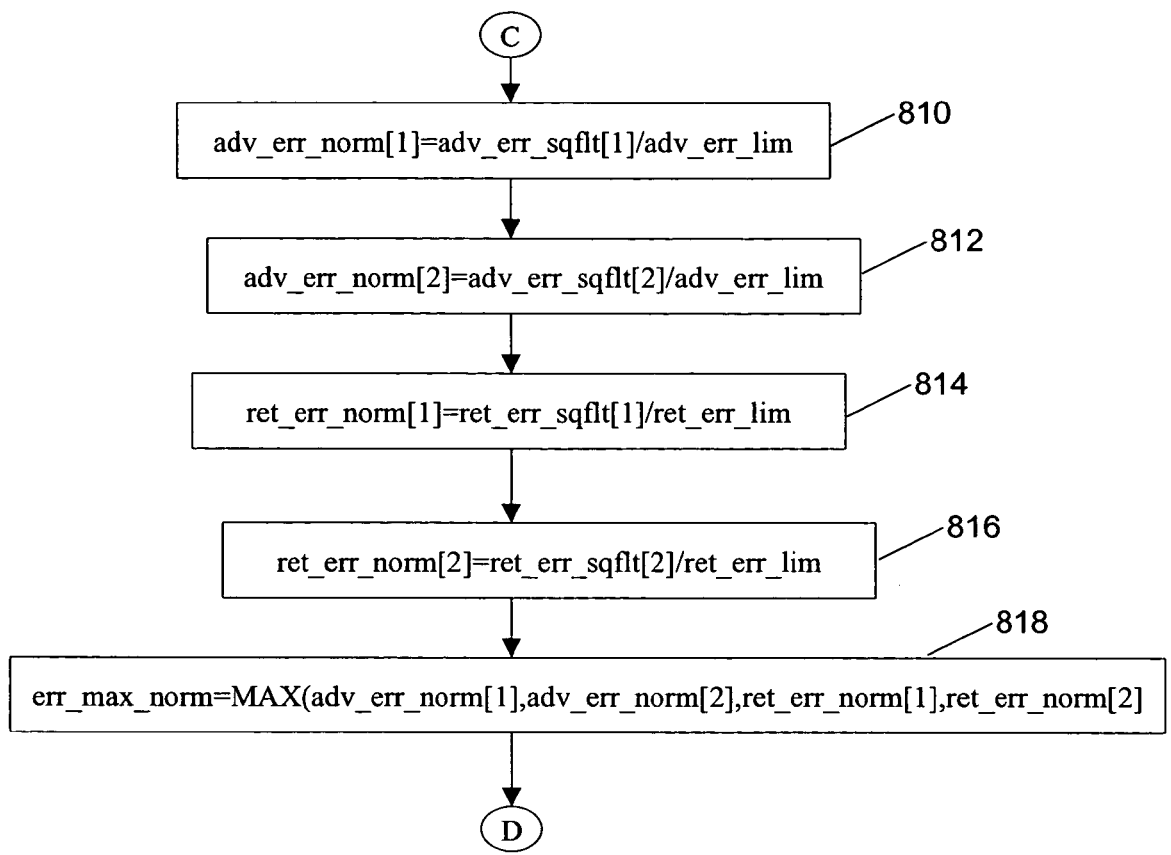
Figure 9:
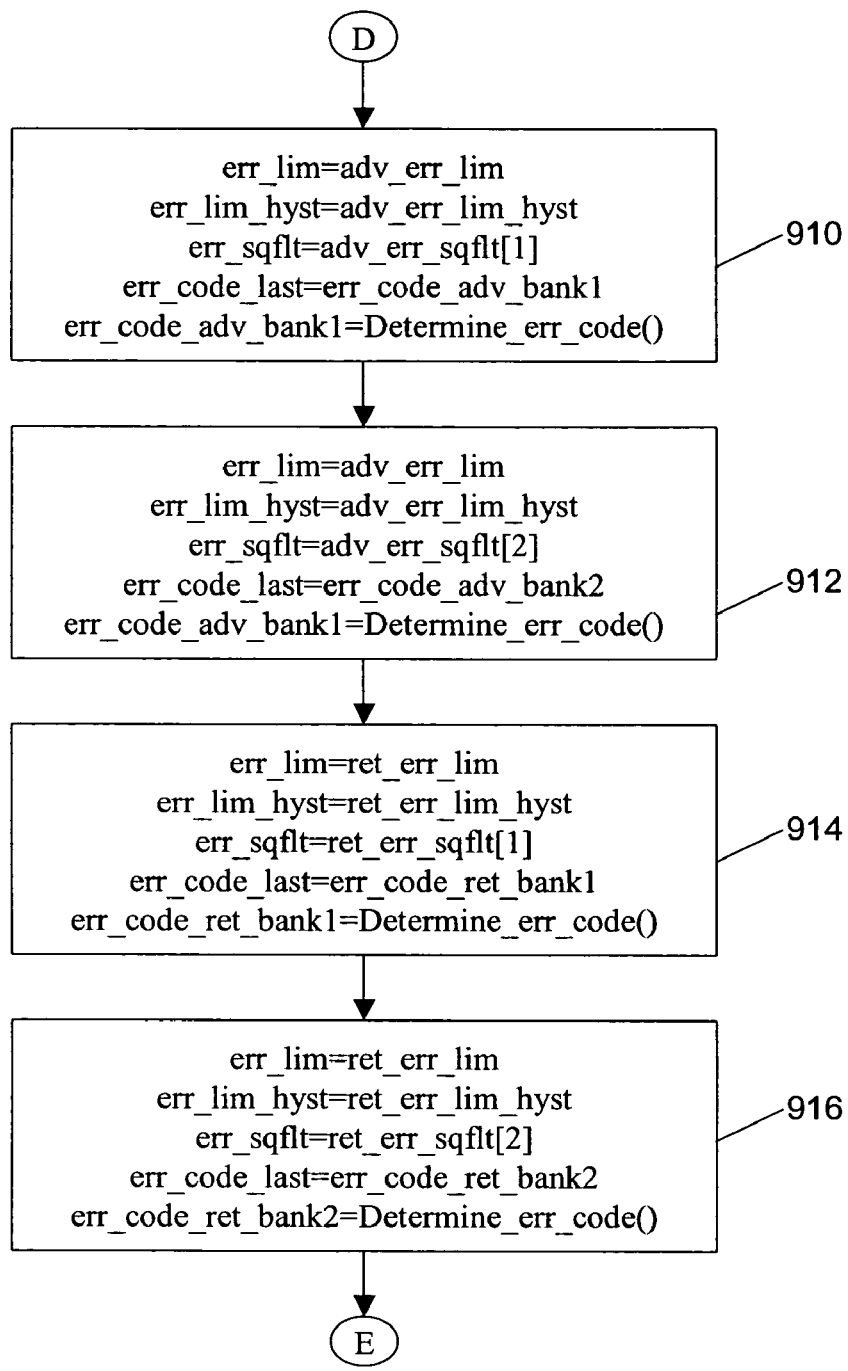

FIGS. 8–9 are the flow diagram representations of the allocation of detected errors that can be used for setting and clearing error codes (for the OBD monitoring function). In this example, the routine evaluates if the VCT operation has returned to acceptable emission levels and indicate that the error code may be cleared, which requires that both the directly evaluated metrics and the difference metrics be satisfied.

Specifically, FIG. 8 begins by normalizing each bank's errors for each cam position direction (810, 812, 814, and 816). Over advanced and over retarded errors may have different thresholds that cause emissions violations since each direction type error results in a different emissions causing mechanism, so the normalization can be used to account for this. Once the errors are normalized they can be compared to determine which error causes the largest effect, establishing the err_max_norm value in 818. Another implementation can either calculate this value and pass it on for error code setting or it can assign a variable that encodes which bank and direction had the more significant error, which will be passed on to determine which code to set.

Figure 10:
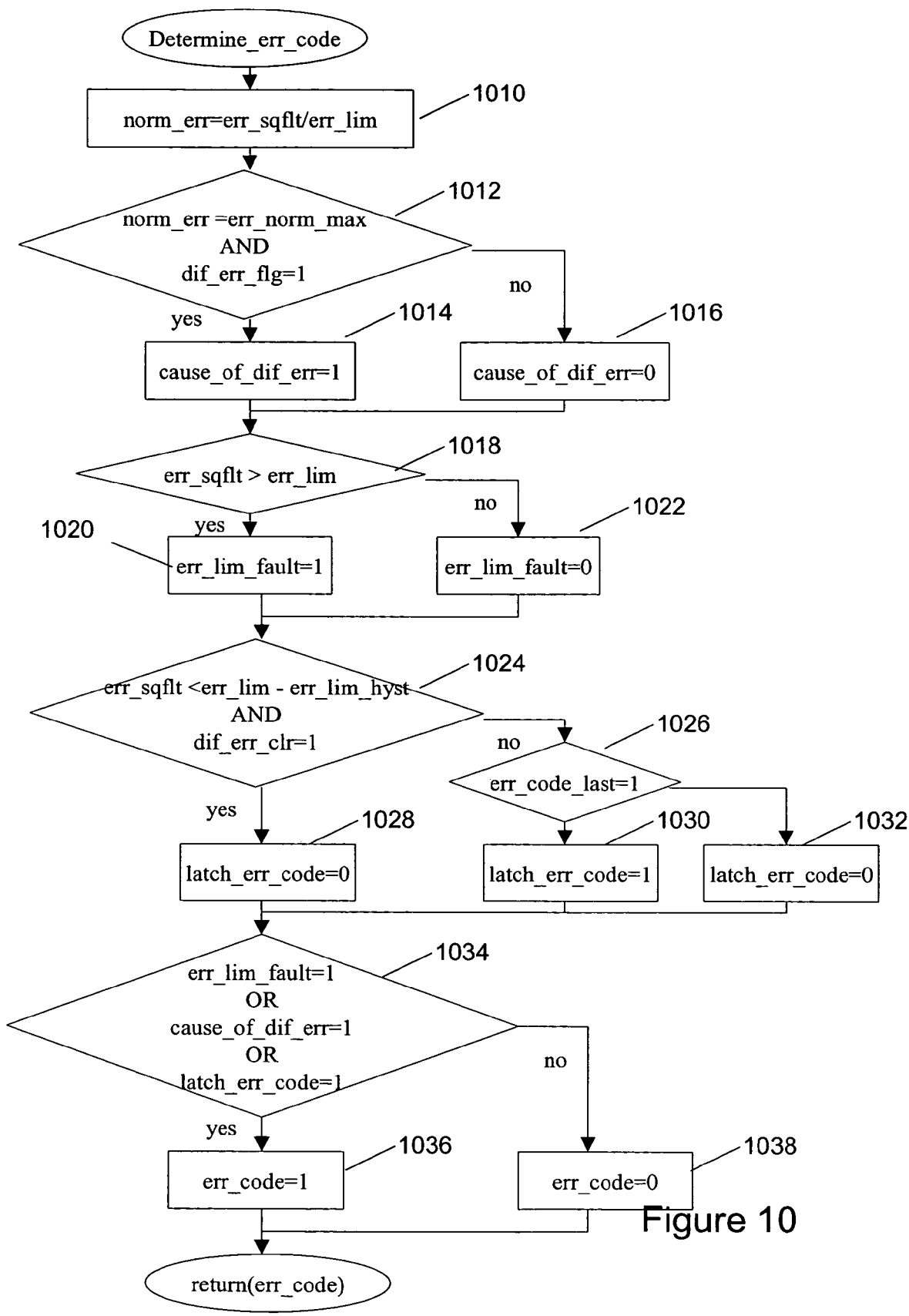

FIG. 9 is a flow diagram that represents the error code setting for over advanced and over retarded errors. A separate function call, Determine_err_code ( ), can be used for each bank and each direction error. The flow diagram illustrates the specific variables loaded into variables that the Determine_err_code( ) uses (910, 912, 914, and 916). This can be treated as a standard function call with input arguments used by most computer languages. The error codes, once detected, should remain set (latched) until deliberately cleared, so the previous state of the error code is preserved between passes of the monitor algorithm, set to err_code_last, and used by Determine_err_code ( ). FIG. 10 shows the details of Determine_err_code ( ), which explains the setting and clearing process in detail.

Specifically referring to FIG. 10, it shows a flow diagram for the function Determine_err_code( ), mentioned above, that sets error codes for each type of error once it has the relevant data from each type of error code. The first step is to normalize the error (1010). If the dif_err_flg is set and the normalized error matches the earlier calculated err_max_norm (1012), then the dif_err_cause (IS THIS THE RIGHT TERM) flag is set indicating that a difference between the banks exists that can cause a 1.5 times emission increase and that the error code under evaluation is the highest among the other CARB specified errors (1014). The error code may also be set because the specific error in question, based on bank and direction, exceeded the limit for its direction (1018) and the err_lim_fault flag is set (1020, 1022). Once the error code is set for a vehicle trip, it typically remains set, based on the controller's strategy implementation of the CARB specified monitor activity, and is therefore latched, as the setting of the flag latch_err_code indicates. However, in one embodiment, it may be possible to continue checking the operation of the VCT, either after the error has been set for a vehicle trip, or on a subsequent trip. If the error reduces sufficiently that it no longer can cause an 1.5 times emission (the required reduction in error can be adjusted by the term err_lim_hyst) for both the bank/direction and the bank to bank difference type errors, then it may be possible to allow latch_err_code to be cleared (1024, 1026, 1028, 1030, and 1032). The final step in FIG. 10 is to either set the err code if the err_lim_fault or dif_err_cause or latch_err_code are set, or to clear the err_code if none of these conditions are met (1034, 1036, and 1038). Finally, the err_code is returned to the place it was called.

Figure 11:
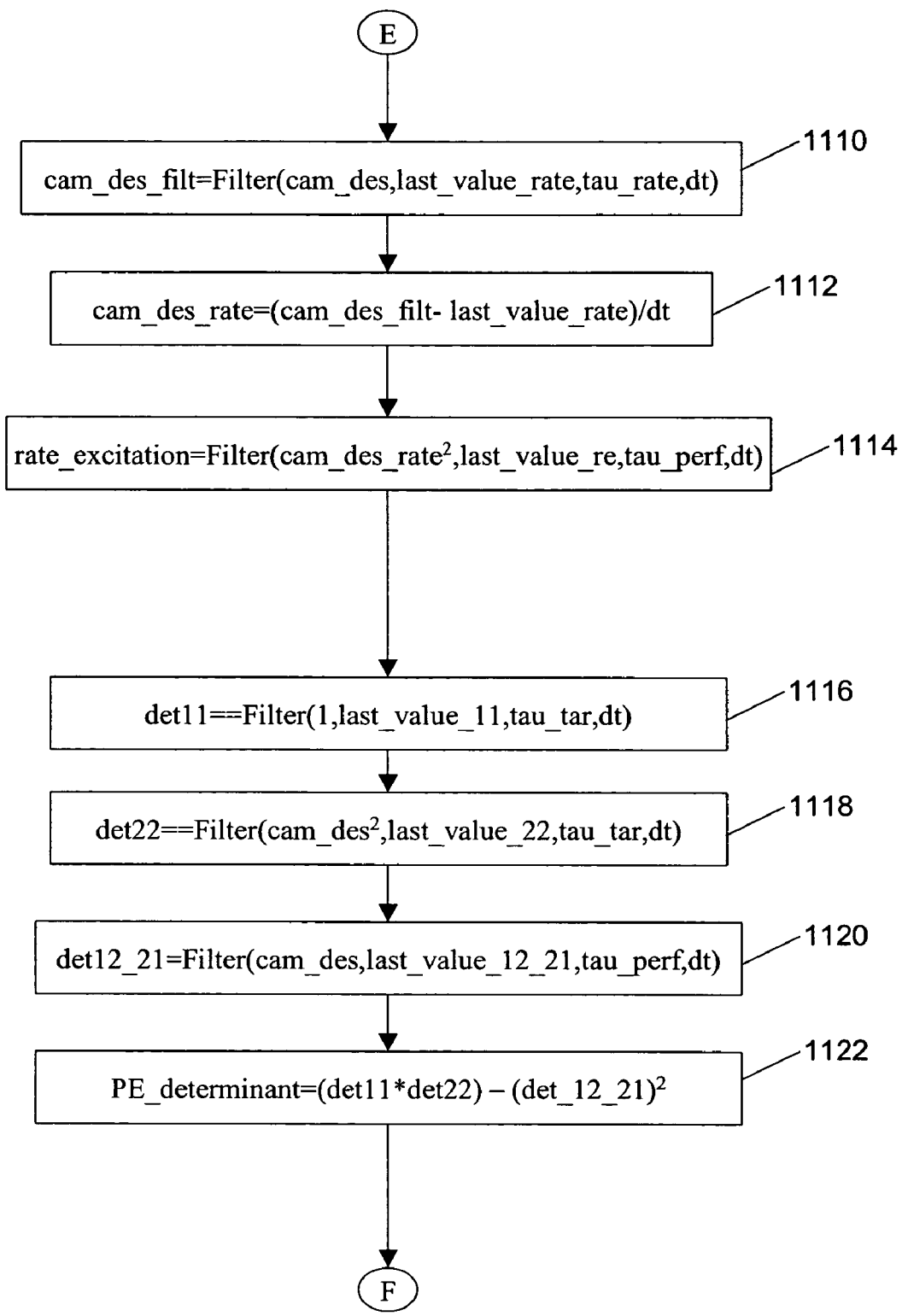

Referring now to FIG. 11, it produces metrics needed to judge if sufficient VCT operation is observed to determine if VCT degradation has caused a 1.5 times emission increase. The algorithm first determines the rate of change of the cam_des signal (1110). Before taking the difference of the signal between algorithm updates, the signal may be filtered so that it is relatively free of higher frequency perturbations, if desired. The rate of change of cam_des utilized is near the frequency response of the VCT actuator since the routine is attempting to determine if the actuator is too slow to respond. Even though cam_des is a controller generated value and is therefore not directly based on sensor input, which can contain signal noise, the cam_des variable may be based on calculations that do use sensor inputs and there may be noise from these sensors. Once the cam_des is filtered (cam_des_filt), the difference between the current and last pass of the filter is determined and then divided by the time between algorithm calls (1112), to establish the rate of change in standard time units such as seconds, assuming dt is in seconds. The rate_excitation is then calculated (1114) the same way as the square error filtered metrics discussed above. A separate time constant, tau_perf, has been specified in this example. By making tau_perf larger (and therefore the accumulated value builds up slower) than tau_mon, the emission monitoring portions of this example can produce an error metric for VCT degradation (assuming such degradation exists) before the trip completion performance monitor reaches a plateau value.

Continuing with FIG. 11, each portion of the PE_determinant, for target errors excitation, calculation is performed (1116, 1118, 1120). Once each portion of the determinant (det11, det22, det12_21) is available, the final PE_determinant is calculated (1122). The calculation of the portions (det11, det22, det12_21) already account for the accumulator with forgetting operation that has been used with the other metrics. Similar to the previous routine, the rate_excitation metric, tau_perf is used.

Figure 12:
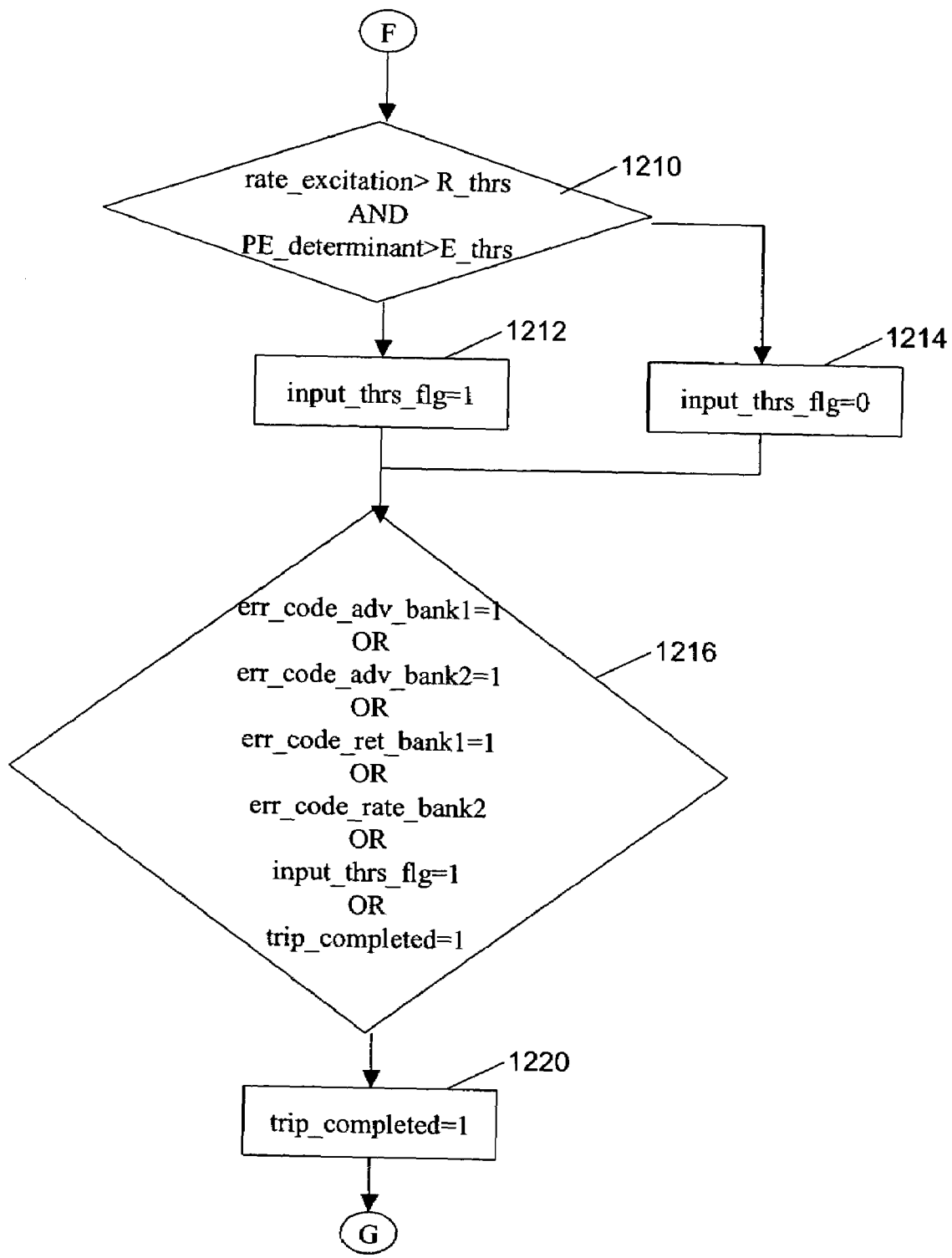

FIG. 12 is a flow diagram that determines if sufficient opportunity has been available to increment the numerator portion of the trip counter either because degradation has been discovered or if no degradation has been detected then sufficient cam_des excitation has occurred (1210, 1212, 1214, and 1216). The trip_completed flag (1218) is an indication to the controller that the numerator portion of the trip counter for the VCT monitor may increment. The trip_completed flag is latched, so that once it is set for a trip, it stays set until the vehicle is re-started.

The subject matter of the present disclosure includes all novel and nonobvious combinations and subcombinations of the various systems and configurations, and other features, functions, and/or properties disclosed herein. For example, in one embodiment, logic may be added to determine whether the camshaft and crankshaft are misaligned by one or more teeth. This test calculates the absolute offset between one of the camshaft teeth and the crankshaft missing tooth at idle when that cam is at its stop. If the error is greater than the malfunction threshold, a cam/crank misalignment error can be indicated.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A system, comprising
an engine having a first group of cylinders and a second group of cylinders;
a first variable valve system in said first group;
a second variable valve system in said second group; and
a controller for determining degradation of operation of at least one of said first and second variable valve systems, said controller determining said degradation in response to controller errors of said valves and differences between operation of said first and second valve systems, where said controller separately considers errors in an advance direction from errors in a retard direction in determining said degradation, where said controller further separately determines an advance direction degradation based on said advance direction errors and a retard direction degradation based on said retard direction errors, and where said controller indicates emission degradation in response to said valve system advance and retard degradation.

2. The system recited in claim 1 wherein said first group includes a first bank, and said second group includes a second bank.

3. The system recited in claim 2 wherein said differences between operation of said first and second valve systems includes bank-to-bank differences of said valve systems.

4. The system recited in claim 1 wherein said first group includes a first bank, said second group includes a second bank, said first variable valve system includes a first variable cam timing system, and said second variable valve system includes a second variable cam timing system, and where said error in a first direction includes over-advanced timing and said error in a second direction includes over-retarded timing.

5. The system recited in claim 4 wherein said differences between operation of said first and second valve systems includes bank-to-bank cam position differences of said variable cam systems.

6. The system recited in claim 5 wherein said determination is independent of intake airflow and rotational speed.

7. The system recited in claim 1 wherein said controller errors include integration of a square of a position error.

8. The system recited in claim 1 wherein said controller further includes a performance monitor to determine whether sufficient monitoring for degradation has occurred.

9. The system recited in claim 4 wherein said first variable cam system is a dual independent system.

10. A system, comprising
an engine having a first bank of cylinders and a second bank of cylinders;
a first variable cam timing system in said first bank;
a second variable cam tuning system in said second bank; and
a controller for determining degradation of operation of at least one of said first and second variable cam timing systems, said controller determining said degradation in response to controller errors of said variable cam timing system and differences between operation of said first and second variable cam timing system, where said errors include cam variance in a retard direction, cam variance in an advance direction, and said differences between systems includes cam timing differences between the systems, and where said controller determines retard direction degradation in response to said retard direction variance, and separately determines advance direction degradation in response to said advance direction variance.

11. The system recited in claim 10 wherein said differences between operation of said first and second variable cam timing systems include bank-to-bank differences of said valve systems.

12. The system recited in claim 11 wherein said differences between operation of said first and second variable cam timing systems includes bank-to-bank cam position differences of said variable cam systems.

13. The system recited in claim 12 wherein said determination is independent of intake airflow and rotational speed.

14. The system recited in claim 13 wherein said controller errors include integration of a square of a position error.

15. The system recited in claim 14 wherein said controller further includes a performance monitor to determine whether sufficient monitoring for degradation has occurred.

16. The system recited in claim 15 wherein said first variable cam system is a dual independent system.

17. A system, comprising:
a V-type engine having a first bank of cylinders and a second bank of cylinders;
a first variable cam timing system in said first bank that adjusts timing of intake and exhaust valves based on a first error between a first desired and first actual value;
a second variable cam timing system in said second bank that adjusts timing of intake and exhaust valves based on a second error between a second desired and second actual value; and
a controller for determining degradation of operation of at least one of said first and second variable cain timing systems, said controller determining said degradation in response to said first and second errors and bank-to-bank timing differences between operation of said first and second variable cam timing system, where said errors include cam variance in a retard direction, cam variance in an advance direction, and where said controller further determines retard direction degradation in response to said retard direction variance, and separately determines advance direction degradation in response to said advance direction variance.

18. The system recited in claim 17 wherein said engine is a direct injection engine.

* * * * *